(12) United States Patent
Zhang

(10) Patent No.: US 12,337,659 B2
(45) Date of Patent: Jun. 24, 2025

(54) ADVANCED VEHICLE HEAT EXCHANGER

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 18/371,611

(22) Filed: Sep. 22, 2023

(65) Prior Publication Data

US 2025/0100353 A1    Mar. 27, 2025

(51) Int. Cl.
| | |
|---|---|
| *F28D 7/02* | (2006.01) |
| *B60H 1/32* | (2006.01) |
| *F28D 21/00* | (2006.01) |
| *F28F 7/02* | (2006.01) |

(52) U.S. Cl.
CPC .............. *B60H 1/32* (2013.01); *F28D 21/00* (2013.01); *F28F 7/02* (2013.01); *B60H 2001/3286* (2013.01); *F28D 2021/008* (2013.01)

(58) Field of Classification Search
CPC ... B60H 1/32; B60H 2001/3286; F28D 21/00; F28D 2021/008; F28F 7/02
USPC ........................................................ 165/165
See application file for complete search history.

(56) References Cited

U.S. PATENT DOCUMENTS

| | | | |
|---|---|---|---|
| 6,032,470 A | 3/2000 | Haselden | |
| 6,449,979 B1 | 9/2002 | Nagasawa et al. | |
| 11,389,765 B2 | 7/2022 | Roy et al. | |
| 2004/0206490 A1 | 10/2004 | Katoh et al. | |
| 2005/0230090 A1 | 10/2005 | Higashiyama | |
| 2015/0027163 A1 | 1/2015 | Ishizaka et al. | |
| 2020/0033070 A1 | 1/2020 | Vlahinos et al. | |
| 2020/0333088 A1 | 10/2020 | Manzo | |
| 2022/0186947 A1 | 6/2022 | Boetcher et al. | |

FOREIGN PATENT DOCUMENTS

| | | | | |
|---|---|---|---|---|
| CN | 107655238 A | 2/2018 | | |
| EP | 0838641 A3 | 4/1998 | | |
| GB | 2490704 A | * 11/2012 | ......... | F28D 15/0275 |
| JP | 2008032382 A | 2/2008 | | |
| JP | 2012193895 A | 10/2012 | | |
| JP | 6295051 B2 | 3/2018 | | |
| KR | 19990025587 A | 4/1999 | | |
| KR | 101406548 B1 | 6/2014 | | |

* cited by examiner

*Primary Examiner* — Davis D Hwu
(74) *Attorney, Agent, or Firm* — Vichit Chea; Price Heneveld LLP

(57) ABSTRACT

A heat exchanger includes a housing. A first cooling block is defined within the housing. The first cooling block includes a coolant inlet, a refrigerant inlet, and a first gyroid structure that defines a first set of coolant channels and a first set of refrigerant channels. A second cooling block is defined within the housing. The second cooling block includes a coolant outlet, a refrigerant outlet, and a second gyroid structure that defines a second set of coolant channels and a second set of refrigerant channels. A perforated barrier plate is interposed between the first cooling block and the second cooling block. The first set of coolant channels is in fluid communication with the second set of coolant channels via perforations in the barrier plate. The first set of refrigerant channels is in fluid communication with the second set of refrigerant channels via perforations in the barrier plate.

20 Claims, 10 Drawing Sheets

ADVANCED VEHICLE HEAT EXCHANGER

FIELD OF THE DISCLOSURE

The present disclosure generally relates to a heat exchanger, in particular, a heat exchanger in a vehicle.

BACKGROUND OF THE DISCLOSURE

Consumers often compare available features and functionality between vehicles when making a purchasing decision. Accordingly, additional solutions are needed that provide features and functionality that are desirable to consumers.

Energy storage systems such as battery electric vehicles (BEVs) or hybrid electric vehicles (HEVs) include a number of batteries electrically connected in parallel or in series. BEV or HEV batteries have specific temperature operating ranges that are critical for battery life and performance. Because battery charging or discharging may be exothermic, depending on the battery composition and the ambient temperature conditions, BEVs and HEVs are equipped with on-board cooling systems to bring electric vehicle batteries within these operating ranges. It is desirable to have compact, efficient cooling systems that minimize the footprint of on-board cooling systems in BEVs and HEVs.

SUMMARY OF THE DISCLOSURE

According to a first aspect of the present disclosure, a heat exchanger is provided. The heat exchange includes a housing and a first cooling block defined within the housing. The first cooling block comprises a coolant inlet, a refrigerant inlet opposing the coolant inlet, and a first gyroid structure defining a first set of coolant channels and a first set of refrigerant channels. A second cooling block is defined within the housing. The second cooling block comprises a coolant outlet, a refrigerant outlet opposing the coolant outlet, and a second gyroid structure defining a second set of coolant channels and a second set of refrigerant channels. The heat exchanger also includes a perforated barrier plate interposed between the first cooling block and the second cooling block. The first set of coolant channels is in fluid communication with the second set of coolant channels via perforations in the barrier plate, and the first set of refrigerant channels is in fluid communication with the second set of refrigerant channels via perforations in the barrier plate.

Embodiments of the first aspect of the present disclosure can include any one or a combination of the following features:
- the coolant inlet further includes coolant introduction channels that direct fluid flow into the first set of coolant channels, and the refrigerant inlet further includes refrigerant introduction channels that direct fluid flow into the first set of refrigerant channels;
- the coolant outlet further includes coolant removal channels that direct fluid flow out of the second set of coolant channels, and the refrigerant outlet further includes refrigerant removal channels that direct fluid flow out of the second set of refrigerant channels;
- at least one of the coolant introduction channels and the refrigerant introduction channels are defined by the first gyroid structure, and at least one of the coolant removal channels and refrigerant removal channels are defined by the second gyroid structure;
- the housing, the first gyroid structure, the second gyroid structure, and the barrier plate are integrally coupled;
- the first gyroid structure defines a first conical recess proximate the coolant inlet and a second conical recess proximate the refrigerant inlet, the second conical recess extends towards the first conical recess;
- the second gyroid structure defines a third conical recess proximate the coolant outlet and a fourth conical recess proximate the refrigerant outlet, the fourth conical recess extends towards the third conical recess;
- the coolant inlet and coolant outlet are arranged on a front panel of the housing, and the refrigerant inlet and refrigerant outlet are arranged on a rear panel of the housing; and
- coolant fluid is directed along a coolant path and refrigerant fluid is directed along a refrigerant path, the refrigerant path being in a counter-flow configuration relative to the coolant path.

According to a second aspect of the present disclosure, a heat exchanger is provided. The heat exchanger includes a housing, a first cooling block defined within the housing. The first cooling block comprises a coolant inlet and a refrigerant outlet opposing the coolant inlet. A second cooling block is defined within the housing. The second cooling block comprises a coolant outlet and a refrigerant inlet opposing the coolant outlet. The heat exchanger also includes a first set of cooling channels and a first set of refrigerant channels defined in at least one of the first cooling block and the second cooling block, and a second set of cooling channels and a second set of refrigerant channels defined in at least one of the first cooling block and the second cooling block. The heat exchanger further includes a perforated barrier plate interposed between the first cooling block and the second cooling block, the first set of coolant channels is in fluid communication with the second set of coolant channels via perforations in the barrier plate, and the first set of refrigerant channels is in fluid communication with the second set of refrigerant channels via perforations in the barrier plate.

Embodiments of the second aspect of the present disclosure can include any one or a combination of the following features:
- a gyroid structure defines at least one of the first set of coolant channels, the second set of coolant channels, the first set of refrigerant channels, and the second set of refrigerant channels;
- a first plurality of tubes are disposed in the first cooling block and a second plurality of tubes are disposed in the second cooling block, and the first plurality of tubes defines at least one of the first set of coolant channels and the second set of refrigerant channels, and the second plurality of tubes defines at least one of the second set of coolant channels and the first set of refrigerant channels;
- the first set of coolant channels extend through the first plurality of tubes and the second set of refrigerant channels are defined by a space between each tube of the first plurality of tubes, and the first set of refrigerant channels extend through the second plurality of tubes and the second set of coolant channels are defined by a space between each tube of the second plurality of tubes;
- a coolant path that directs coolant fluid through the first cooling block, across the barrier plate, and through the second cooling block, and a refrigerant path that directs refrigerant fluid through the first cooling block, across the barrier plate, and through the second cooling block, wherein the refrigerant path directs refrigerant fluid in a counter-flow to the coolant fluid in the coolant path; and the coolant inlet and coolant outlet are arranged on the same side of the heat exchanger, and the refrigerant inlet and refrigerant outlet are arranged on the same side of the heat exchanger.

According to a third aspect of the present disclosure, a heat exchanger is provided. The heat exchanger includes a housing and a first cooling block defined within the housing. The first cooling block comprises a coolant inlet and a refrigerant outlet opposing the coolant inlet. A second cooling block is defined within the housing. The second cooling block comprises a coolant outlet and a refrigerant inlet opposing the coolant outlet. The heat exchange also includes a perforated barrier plate interposed between the first cooling block and the second cooling block, the perforated barrier plate defining a plurality of perforations on opposing ends of the barrier plate, a first plurality of tubes disposed in the first cooling block, the first plurality of tubes directing coolant fluid from the coolant inlet to the plurality of perforations, and a second plurality of tubes disposed in the second cooling block, the second plurality of tubes directing refrigerant fluid from the refrigerant inlet to the plurality of perforations.

Embodiments of the third aspect of the present disclosure can include any one or a combination of the following features:

- the first plurality of tubes defines at least one of the first set of coolant channels and the second set of refrigerant channels, and the second plurality of tubes defines at least one of the second set of coolant channels and the first set of refrigerant channels;
- the first set of coolant channels extend through the first plurality of tubes and the second set of refrigerant channels are defined by a space between each tube of the first plurality of tubes, and w the first set of refrigerant channels extend through the second plurality of tubes and the second set of coolant channels are defined by a space between each tube of the second plurality of tubes;
- a coolant introduction plate disposed in the first cooling block, the coolant introduction plate being obliquely oriented and extending from a front panel of the housing to a rear panel of the housing, and a refrigerant introduction plate disposed in the second cooling block, the refrigerant introduction plate being obliquely orientated and extending from the rear panel and towards the front panel; and
- the first plurality of tubes are coupled to the coolant introduction plate, and the first plurality of tubes each include an inlet, each inlet being flush with the coolant introduction plate, and the second plurality of tubes are coupled to the refrigerant introduction plate, and the second plurality of tubes each include an inlet, each inlet being flush with the refrigerant introduction plate.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
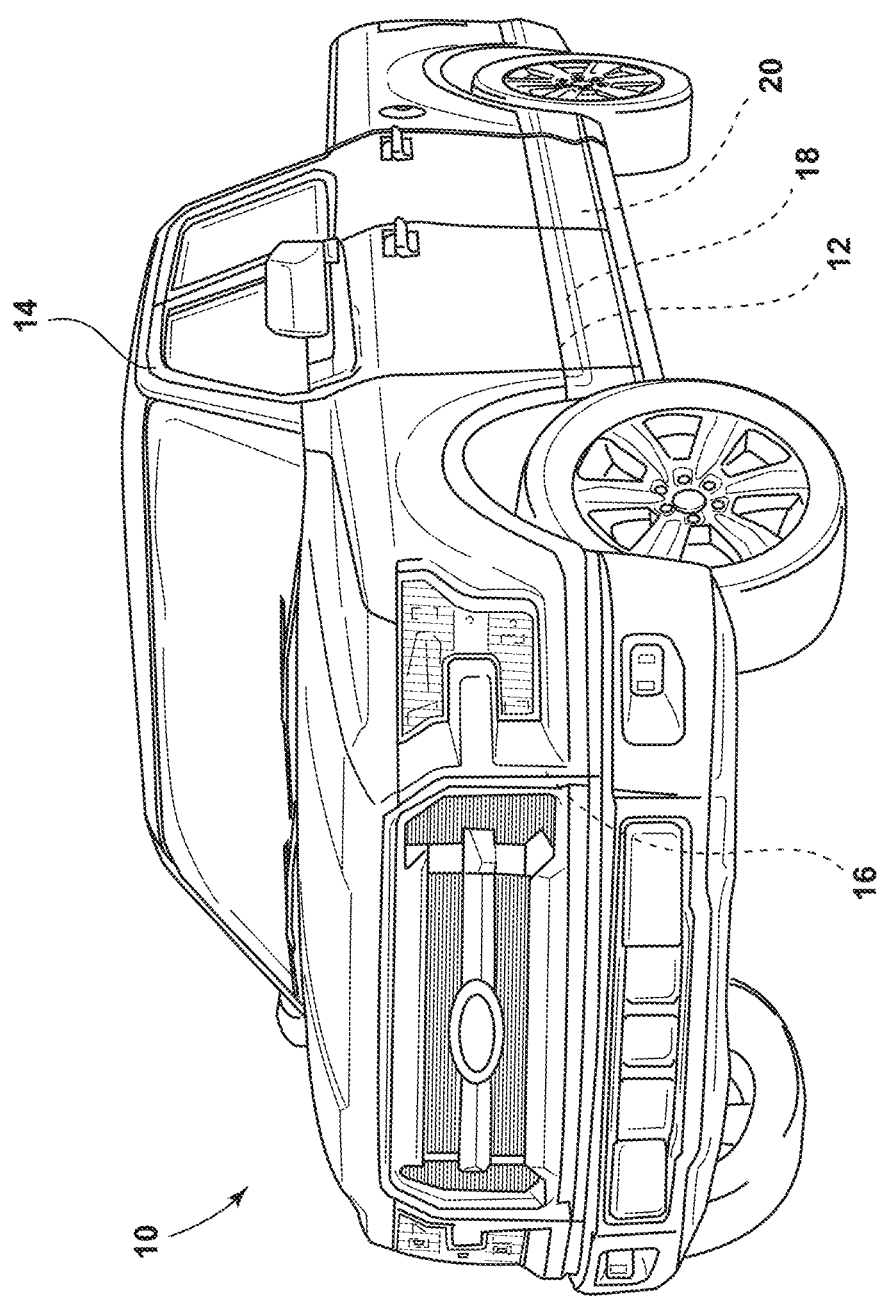
FIG. 1 is a perspective view of a vehicle, according to one embodiment.
Figure 2:
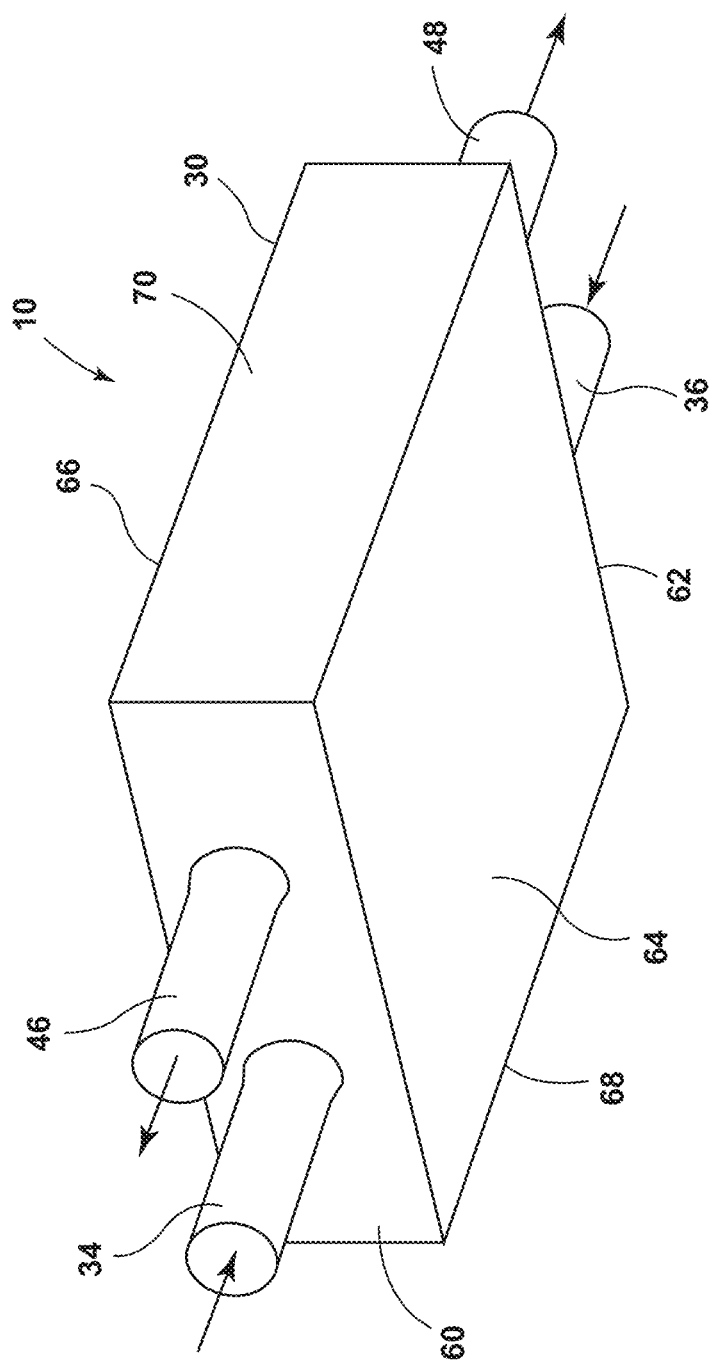
FIG. 2 is a perspective view of a heat exchanger, according to one embodiment.
Figure 3:
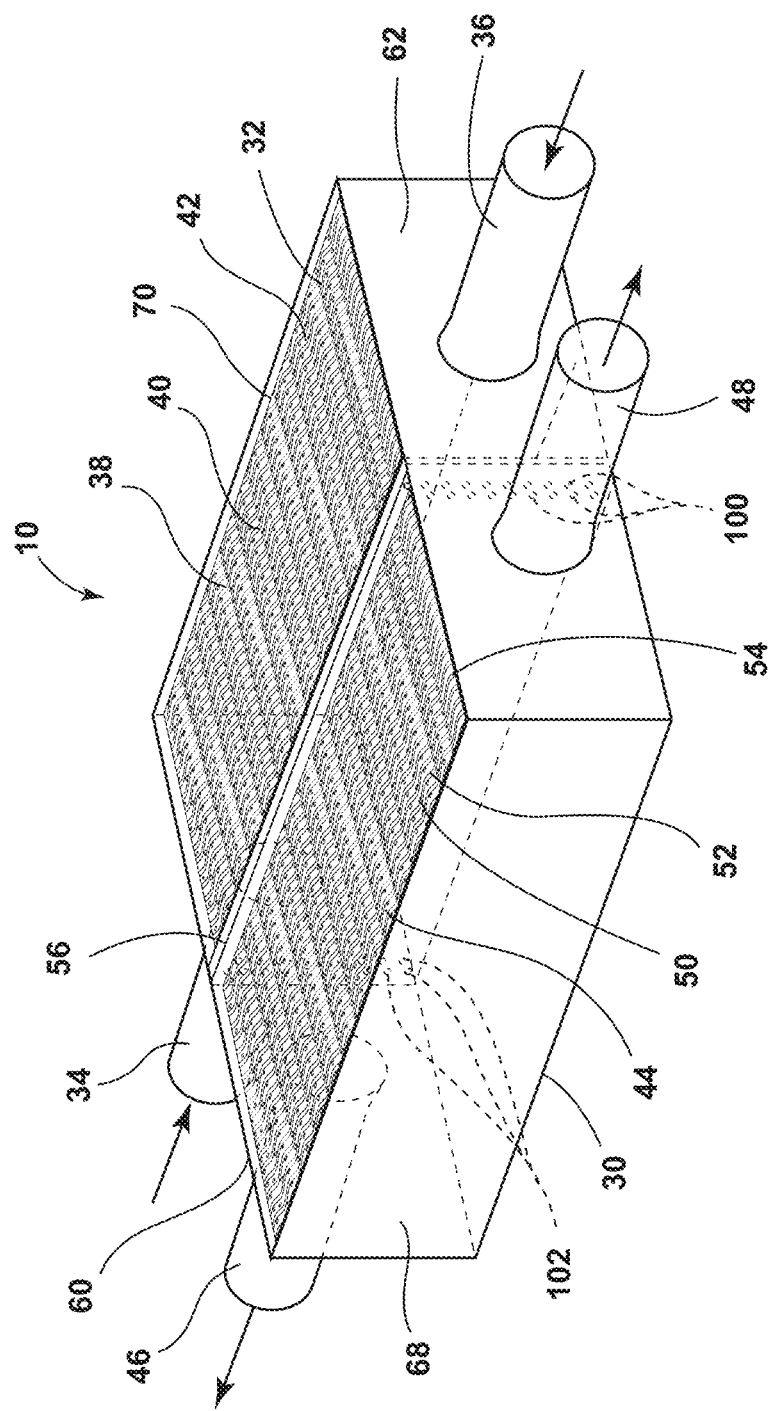
FIG. 3 is a perspective view of a heat exchanger with a gyroid structure, according to one embodiment.
Figure 4:
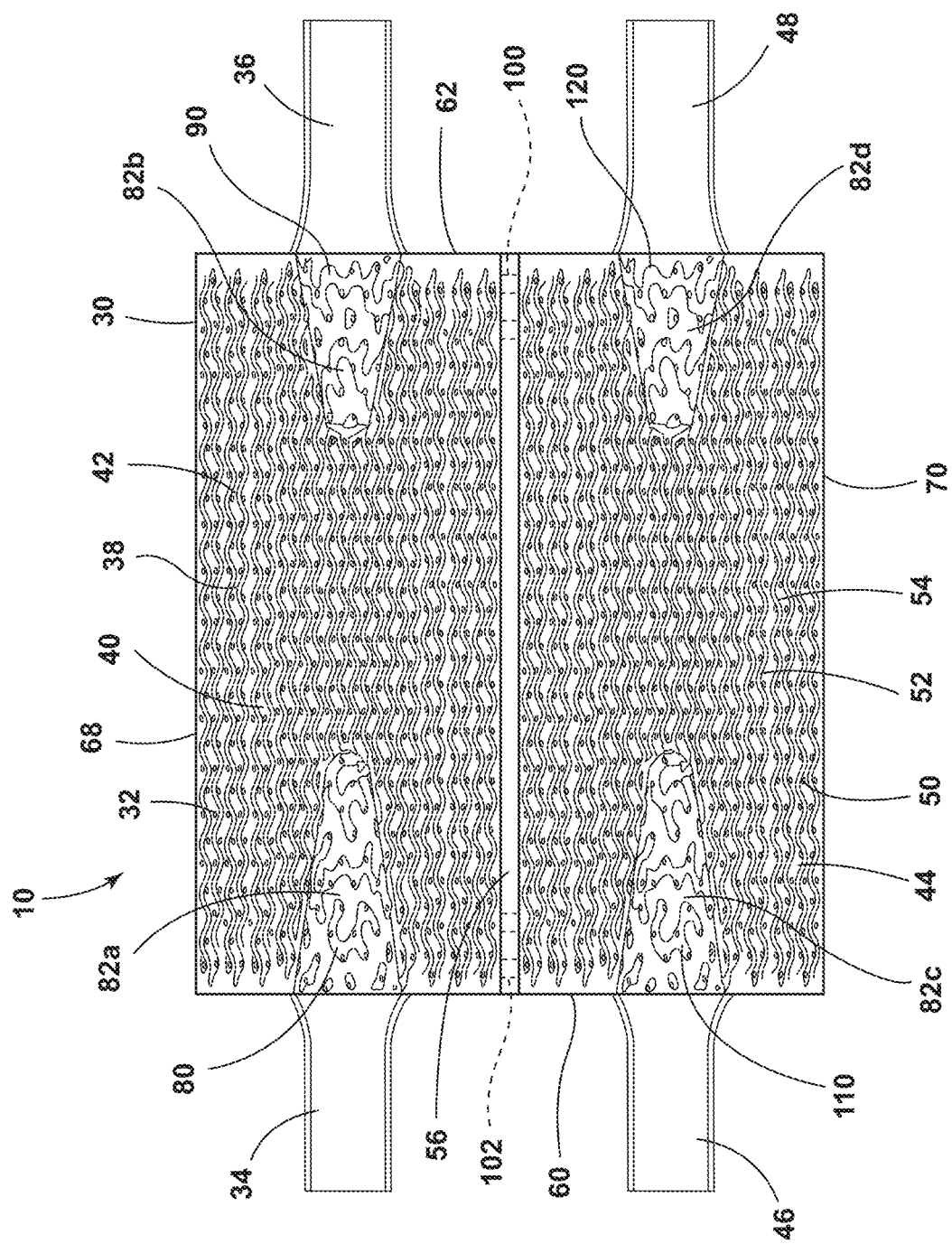
FIG. 4 is a top cross-sectional view of a heat exchanger with a first gyroid structure and a second gyroid structure, according to one embodiment.
Figure 5:
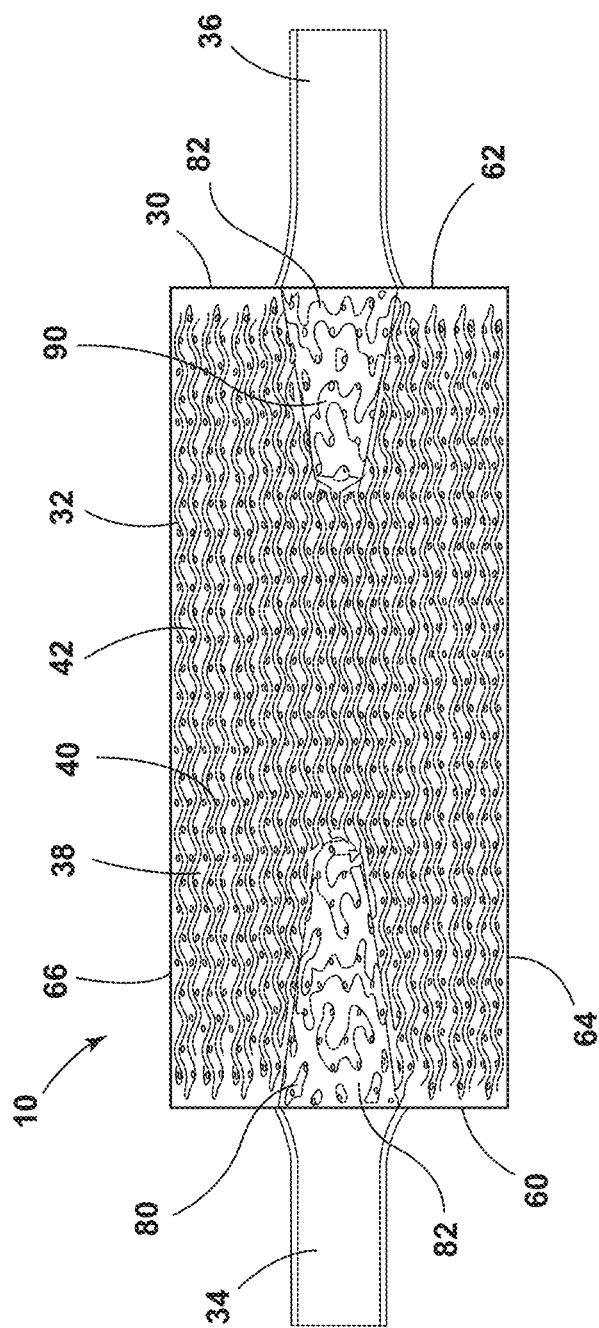
FIG. 5 is a side cross-sectional view of a heat exchanger with a gyroid structure and a conical recess, according to one embodiment.
Figure 6:
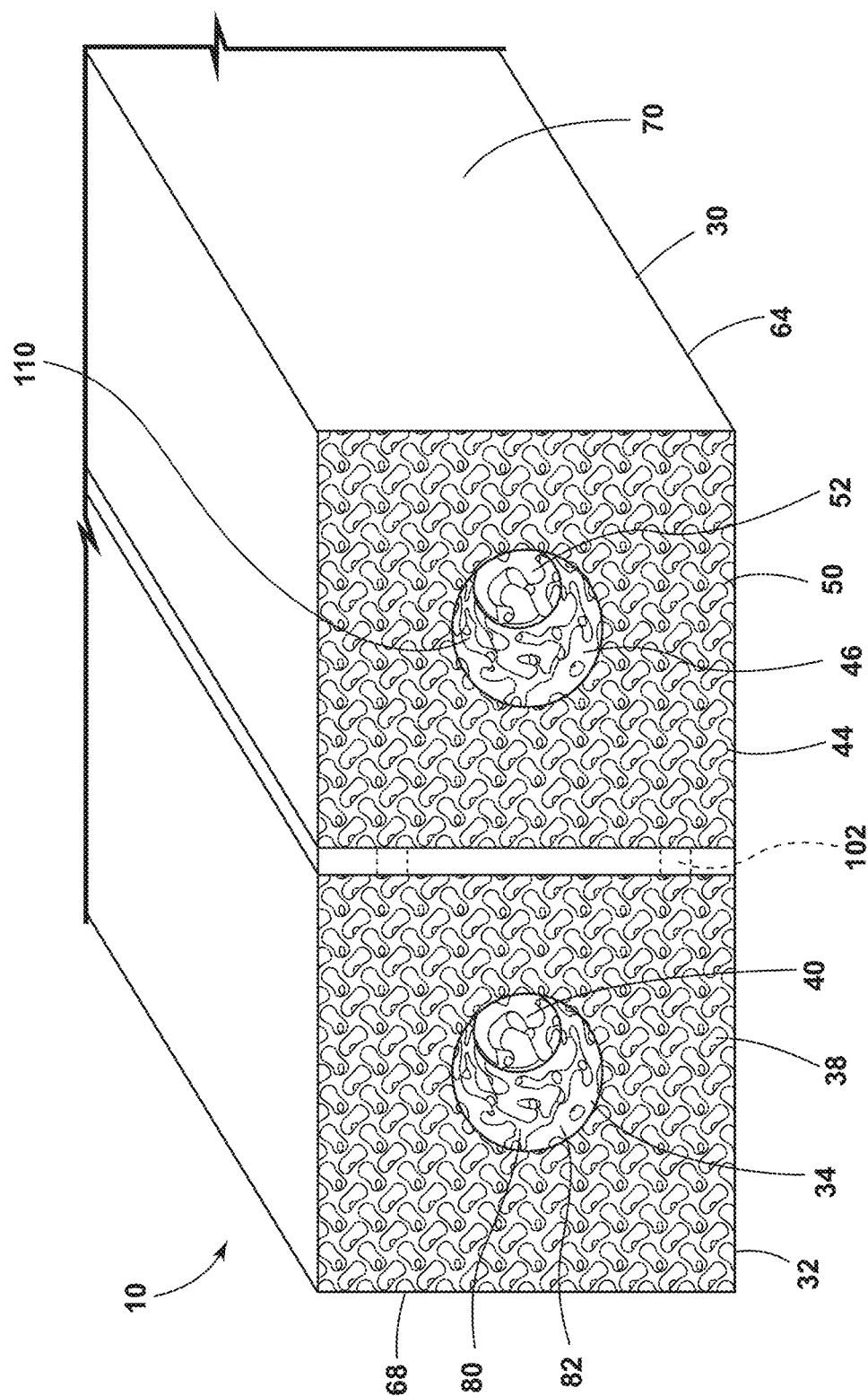
FIG. 6 is a front cross-sectional view of a heat exchanger with a first gyroid structure, a second gyroid structure, and a barrier plate, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

The present illustrated embodiments reside primarily in combinations of method steps and apparatus components related to a heat exchanger. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A. B, and/or C, the composition can contain A alone; B alone; C alone;

A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein the term "refrigerant" refers to the fluid used in a refrigeration cycle that is used in an air conditioning or heat pump system. Refrigerant fluids may be phase-change fluids such that the fluid condenses to a liquid when cooled during the refrigeration cycle and is heated to a gas when heating during the refrigeration cycle.

As used herein the term "coolant" refers to a fluid that is cooled in order to remove or dissipate heat from an object or system.

As used herein the term "counterflow" refers to a heat exchanger geometry that uses at least two paths and maximizes the temperature gradient between the at least two fluids in the heat exchanger cavities by operating the flow paths in an antiparallel direction.

As used herein the phrase "manufactured as a single piece" refers to a device that is manufactured in a process that forms a single, unified component or piece, which is cast or manufactured as a whole, without requiring separate manufacturing processes to create a plurality of pieces that are subsequently joined together.

Referring now to FIG. 1, depicted is a vehicle 12 that includes a vehicle body 14 and a drive unit 16. The drive unit 16 of vehicle 12 may include a battery system 18 in aspects where the vehicle 12 is configured as a battery electric vehicle (BEV) or a hybrid electric vehicle (HEV). The battery system 18 is in electrical communication with the drive unit 16 of the vehicle 12, such as one or more electric motors that are mechanically coupled to wheels of the vehicle 12. The drive unit 16 of vehicle 12 may additionally or alternatively include an internal combustion engine (ICE) or a fuel cell to provide operative force for the vehicle 12.

As the battery system 18 provides electricity to the drive unit 16, it may be desirable to maintain an operating temperature of the battery system 18 using a cooling system 20 to deliver coolant to the battery system 18. In particular, the cooling system 20 may comprise one or more heat exchangers 10 to efficiently transfer heat from the coolant fluid to a refrigerant fluid.

Referring to FIGS. 1-7, the vehicle 12 includes the heat exchanger 10. The heat exchanger 10 includes a housing 30 and a first coolant block 32 defined within the housing 30. The first coolant block 32 includes a coolant inlet 34, a refrigerant inlet 36 opposing the coolant inlet 34, and a first gyroid structure 38 that defines a first set of coolant channels 40 and a first set of refrigerant channels 42. A second cooling block 44 is also defined within the housing 30. The second cooling block 44 includes a coolant outlet 46, a refrigerant outlet 48 that opposes the coolant outlet 46, and a second gyroid structure 50 that defines a second set of coolant channels 52 and a second set of refrigerant channels 54. A perforated barrier plate 56 is interposed between the first cooling block 32 and the second cooling block 44. The first set of coolant channels 40 is in fluid communication with the second set of coolant channels 52 via perforations in the barrier plate 56. The first set of refrigerant channels 42 is in fluid communication with the second set of refrigerant channels 54 via perforations in the barrier plate 56.

Referring to FIGS. 1-10, the heat exchanger 10 includes the housing 30. The housing 30 includes a front panel 60, a rear panel 62 opposing the front panel 60, a bottom panel 64 and a top panel 66 extending between the front panel 60 and the rear panel 62, and a first side panel 68 and a second side panel 70 opposing the first side panel 68. According to various aspects, the housing 30 can define one of various shapes, such as a quadrilateral shape, a rounded shape, and/or one of other various shapes. According to various aspects, the housing 30 is configured to enclose various components of the heat exchanger 10, as provided herein.

Referring to FIGS. 1-10, the housing 30 of the heat exchanger 10 may be a fabricated in an additive manufacturing process that manufactures additional components of the heat exchanger 10. In other embodiments, the housing 30 of heat exchanger 10 may be fabricated in a separate manufacturing process wherein the first cooling block 32, second cooling block 44, and barrier plate 56 are attached to the housing 30.

Figure 7:
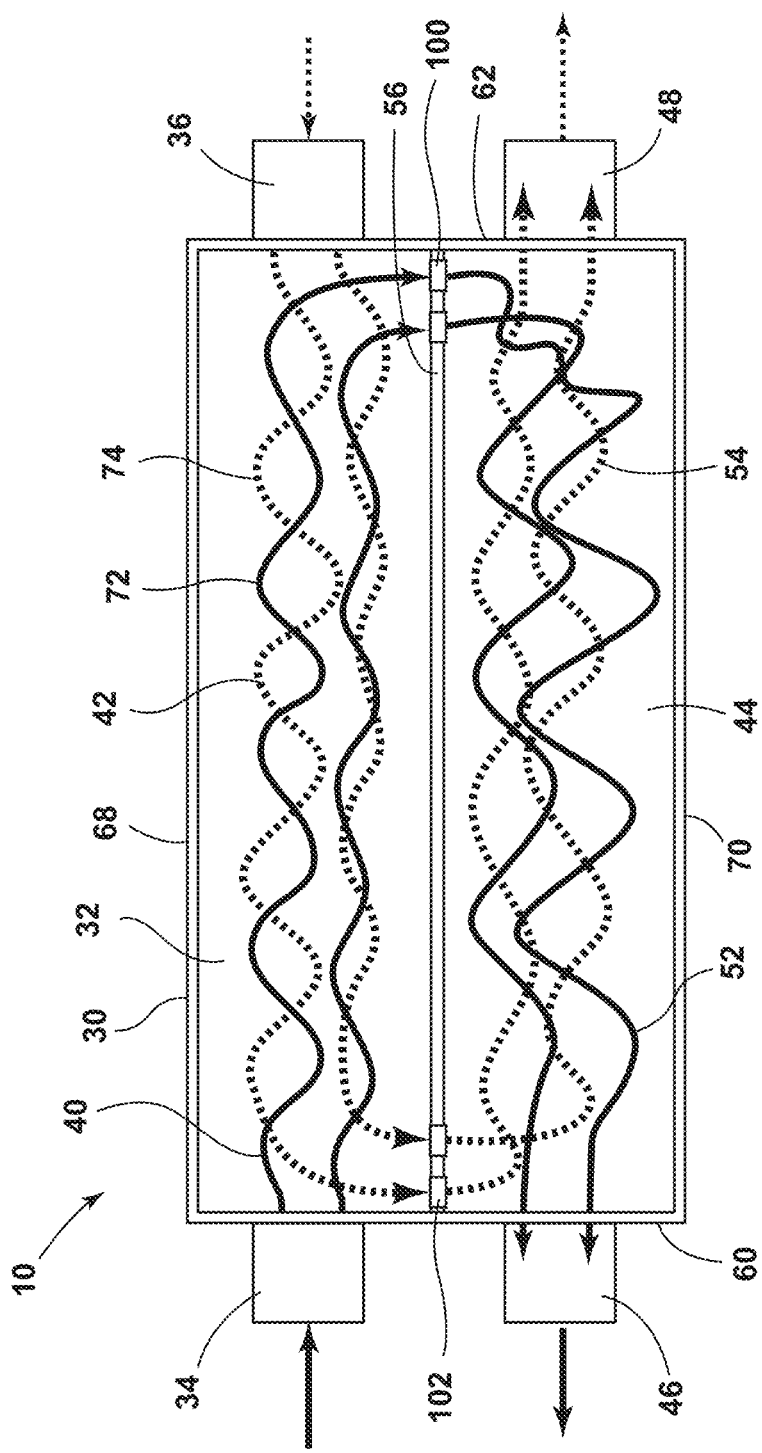
FIG. 7 is a top view of a heat exchanger with a coolant path and a refrigerant path that travel through a barrier plate, according to one embodiment.
Figure 10:
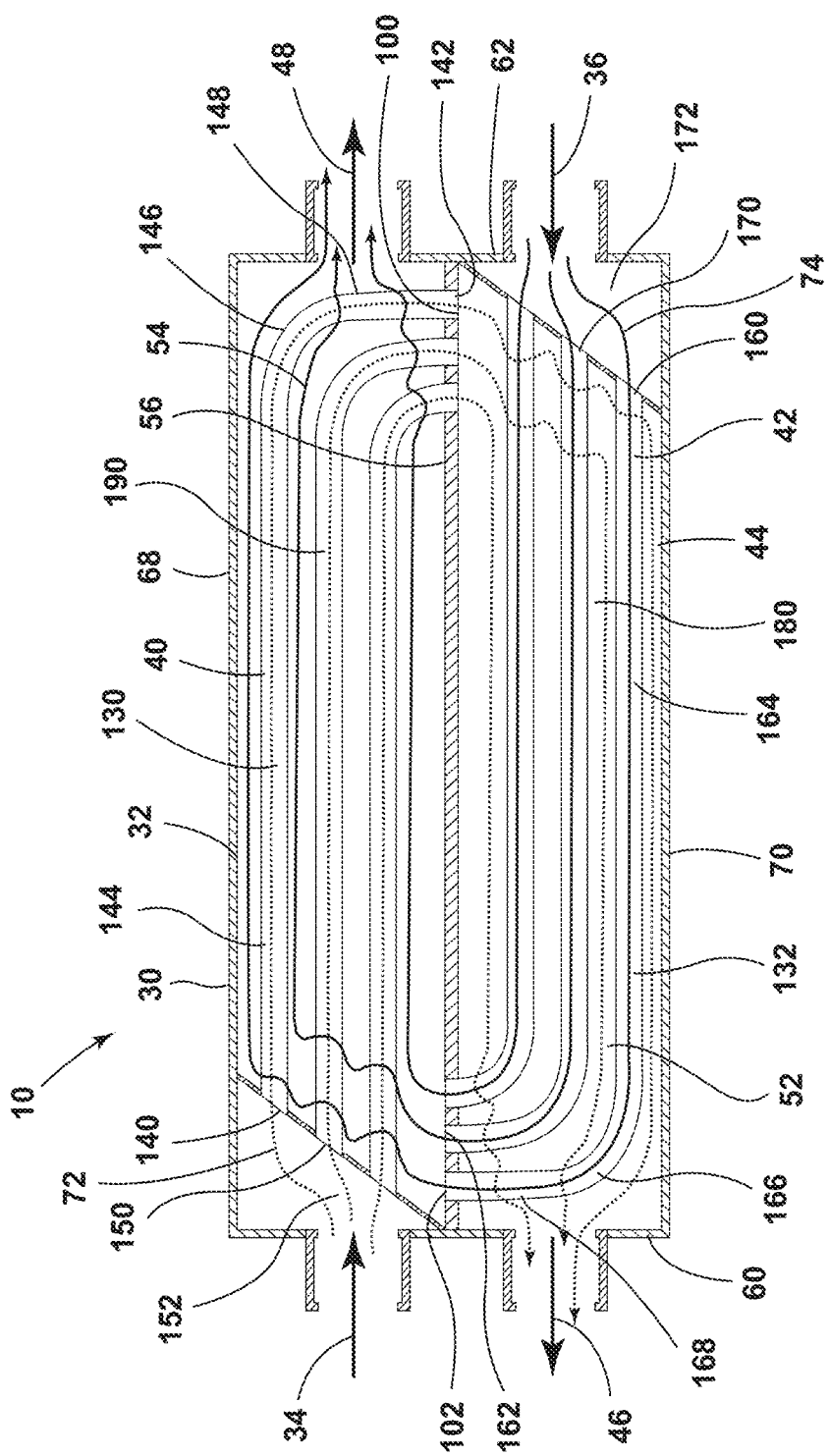
FIG. 10 is a top view of a heat exchanger with a coolant path and a refrigerant path that travel along a first plurality of tubes and a second plurality of tubes, according to one embodiment.

Referring to FIGS. 7 and 10, the housing 30 has a structure that defines at least one coolant path 72 and at least one refrigerant path 74. The coolant path 72 and the refrigerant path 74 are in thermal communication, such that fluid in the coolant path 72 can transfer heat to fluid in the refrigerant path 74, heating the fluid in the refrigerant path 74 and cooling the fluid in the coolant path 72, as provided herein.

Referring to FIGS. 2-10, the housing 30 includes the barrier plate 56 disposed within the housing 30. In some examples, the barrier plate 56 extends across a width and/or depth of the housing 30. For example, the barrier plate 56 can extend from the front panel 60 to the rear panel 62 of the housing 30 such that a first cooling block 32 and a second cooling block 44 are defined within the housing 30, where both cooling blocks 32, 44 are separated by the barrier plate 56. The barrier plate 56 may be integrally formed in the same machining or manufacturing process as the first cooling block 32 and/or the second cooling block 44. Alternatively, the barrier plate 56 may be made in a separate machining or manufacturing process such that it is physically attached to the first cooling block 32 and/or the second cooling block 44 in subsequent steps.

Referring again to FIGS. 2-7, the housing 30 can enclose one or more gyroid structures. In some examples, the housing 30 can enclose the first gyroid structure 38 in the first cooling block 32 and the second gyroid structure 50 in the second cooling block 44. As used herein, a gyroid structure is a three-dimensional lattice which forms at least two interpenetrating labyrinths. The bulk of the gyroid structure, defined as channels that are not bound by the heat exchanger housing 30 or the barrier plate 56, are intersection-free and infinitely triply periodic minimal surfaces. The bulk of the gyroid structure has a structure that can be approximated through the equation sin ([x] cos [y])+ (sin [y] cos [z])+ (sin [z] cos [x])=0, where x, y, and z are coordinates for a point on a 3-dimensional graph having an x-, y-, and z-axis. Gyroids have large surface-area-to-volume ratios, and when a gyroid structure is incorporated into a heat exchanger, the gyroid structure allows substantial thermal contact between the fluids housed within the passages.

In the embodiments illustrated in FIGS. 2-7, the housing 30 includes the coolant inlet 34 and the refrigerant inlet 36. The coolant inlet 34 is intended to guide the coolant fluid into the first cooling block 32 and the refrigerant inlet 36 is intended to guide the refrigerant fluid into the first cooling block 32, where the introduction of the refrigerant fluid may be in a general counter-flow to the coolant fluid. In some aspects, both the coolant inlet 34 and the refrigerant inlet 36 are coupled to the housing 30. For example, the coolant inlet 34 and the refrigerant inlet 36 can be coupled to opposing sides of the housing 30, which allows for counter-flow where the refrigerant fluid flows in the opposite direction as the coolant fluid. Further, while the coolant inlet 34 and refrigerant inlet 36 may be arranged where the inlet fluid flow is perpendicular to the housing 30, it is further contemplated that the coolant inlet 34 and/or refrigerant inlet 36 may also form an acute angle between the surface of the inlet 34, 36 and the housing 30.

In the embodiments illustrated in FIGS. 2-7, the first cooling block 32 includes coolant introduction channels 80 that are in fluid communication with the coolant inlet 34. In some embodiments, the first gyroid structure 38 defines the coolant introduction channels 80. In such embodiments, the first gyroid structure 38 may define one of various shapes that, in turn, define the coolant introduction channels 80. For example, the first gyroid structure 38 may define a conical recess 82, where the coolant introduction channels 80 are defined along an outer periphery of the conical recess 82. According to various aspects, the coolant introduction channels 80 have a cross-section that is lesser than the cross-section of the coolant inlet 34. In other aspects, the coolant introduction channels 80 may have a cross-section greater than the first set of coolant channels 40. The coolant introduction channels 80 are in fluid communication with the coolant inlet 34 and the first set of coolant channels 40 such that coolant fluid may flow from the coolant inlet 34 to the first set of coolant channels 40. Additionally, it is generally contemplated that the coolant introduction channels 80 may have a shape defined by the interface of the coolant introduction channels 80 with the first set of coolant channels 40, and where that interface may at least partially determine a flow-rate of the coolant fluid into the first set of coolant channels 40.

In the embodiments illustrated in FIGS. 2-7, the first cooling block 32 includes refrigerant introduction channels 90 that are in fluid communication with the refrigerant inlet 36. In some embodiments, the first gyroid structure 38 defines the refrigerant introduction channels 90. In such embodiments, the first gyroid structure 38 may define one of various shapes that, in turn, define the refrigerant introduction channels 90. For example, the first gyroid structure 38 may define a conical recess 82, where the refrigerant introduction channels 90 are defined along an outer periphery of the conical recess 82. In such aspects, the conical recess 82 may have a shape and/or size that differs from a conical recess that at least partially defines the coolant introduction channels 80. According to various aspects, the refrigerant introduction channels 90 have a cross-section that is lesser than the cross-section of the refrigerant inlet 36. In other aspects, the refrigerant introduction channels 90 may have a cross-section greater than the first set of refrigerant channels 42. The refrigerant introduction channels 90 are in fluid communication with the refrigerant inlet 36 and the first set of refrigerant channels 42 such that refrigerant fluid may flow from the refrigerant inlet 36 to the first set of refrigerant channels 42. Additionally, it is generally contemplated that the refrigerant introduction channels 90 may have a shape defined by the interface of the refrigerant introduction channels 90 with the first set of refrigerant channels 42, and where that interface may at least partially determine a flow-rate of the refrigerant fluid into the first set of refrigerant channels 42.

Referring to FIGS. 3-7, the first set of coolant channels 40 are defined in the first cooling block 32. In some examples, the first set of coolant channels 40 extends from the coolant inlet 34 and towards the refrigerant inlet 36. In various aspects, the first gyroid structure 38 defines the first set of coolant channels 40. In such aspects, the first set of coolant channels 40 may be in direct fluid communication with the coolant inlet 34, or the first set of coolant channels 40 may be in fluid communication with the coolant inlet 34 via the coolant introduction channels 80.

Referring again to FIGS. 3-7, the first set of refrigerant channels 42 are defined in the first cooling block 32. In some examples, the first set of refrigerant channels 42 extends from the refrigerant inlet 36 and towards the coolant inlet 34. In various aspects, the first gyroid structure 38 defines the first set of refrigerant channels 42. In such aspects, the first set of refrigerant channels 42 may be in direct fluid communication with the refrigerant inlet 36, or the first set of refrigerant channels 42 may be in fluid communication with the refrigerant inlet 36 via the refrigerant introduction channels 90.

As shown in in FIGS. 2-7, the first set of coolant channels 40 is in thermal communication with the first set of refrigerant channels 42. The interpenetrating labyrinth network of the first gyroid structure 38 that defines the first set of coolant channels 40 and the first set of refrigerant channels 42 has a large surface area that facilitates heat transfer from cooling fluid housed within the first set of coolant channels 40 to the refrigerant fluid housed within the first set of refrigerant channels 42, thereby cooling the coolant.

According to various aspects, the first set of coolant channels 40 may extend from the coolant inlet 34 to a first plurality of perforations 100 that are defined on an end of the barrier plate 56 and the first set of refrigerant channels 42 may extend from the refrigerant inlet 36 to a second plurality of perforations 102 that are defined on an opposing end of the barrier plate 56. The first plurality of perforations 100 and the second plurality of perforations 102 may be such that the coolant fluid and the refrigerant fluid may flow across the barrier plate 56 and into the second cooling block 44. In such aspects, the coolant fluid within the first set of coolant channels 40 may flow into the second set of coolant channels 52, and the refrigerant fluid within the first set of refrigerant channels 42 may flow into the second set of refrigerant channels 54, as provided herein.

The size and number of perforations in the barrier plate 56 will vary depending on the desired flow characteristics. In some embodiments the perforation size and geometry will be matched to the coolant channels 40, 52 and the refrigerant channels 42, 54 that are coupled to the barrier plate 56. In some embodiments, the number of perforations on the barrier plate 56 will be the same for the coolant path 72 as it is for the refrigerant path 74. In other embodiments, the number of perforations on the barrier plate 56 may be unequal such that there are more perforations in the barrier plate 56 for communicating coolant fluid from the first set of coolant channels 40 to the second set of coolant channels 52 than there are perforations in the barrier plate 56 to communicate refrigerant from the first set of refrigerant channels 42 to the second set of refrigerant channels 54. In some embodiments the number of perforations on the barrier plate 56 be unequal such that there are more perforations in the barrier plate 56 for communicating refrigerant fluid from the first set of refrigerant channels 42 to the second set of refrigerant channels 54 than there are perforations in the barrier plate 56 to communicate coolant from the first set of coolant channels 40 to the second set of coolant channels 52.

Referring again to FIGS. 3-7, the second set of coolant channels 52 is defined in the second cooling block 44. In some examples, the second set of coolant channels 52 extends from the first plurality of perforations 100 near the refrigerant outlet 48 and towards the coolant outlet 46. In various aspects, the second gyroid structure 50 defines the second set of coolant channels 52. In such aspects, the second set of coolant channels 52 may be in direct fluid communication with the coolant outlet 46, or the second set of coolant channels 52 may be in fluid communication with the coolant outlet 46 via coolant removal channels 110.

The second set of refrigerant channels 54 is defined in the second cooling block 44. In some examples, the second set of refrigerant channels 54 extends from the second plurality of perforations 102 near the coolant outlet 46 and towards the refrigerant outlet 48. In various aspects, the second gyroid structure 50 defines the second set of refrigerant channels 54. In such aspects, the refrigerant fluid in the second set of refrigerant channels 54 may flow in parallel, in counter-flow, or obliquely relative to the coolant flow in the second set of coolant channels 52. The second set of refrigerant channels 54 may be in direct fluid communication with the refrigerant outlet 48, or the second set of refrigerant channels 54 may be in fluid communication with the refrigerant outlet 48 via refrigerant removal channels 120.

As shown in FIGS. 4-7, the second set of coolant channels 52 is in thermal communication with the second set of refrigerant channels 54. The interpenetrating labyrinth network of the gyroid structure that defines second set of coolant channels 52 and second set of refrigerant channels 54 has a large surface area that facilitates heat transfer from cooling fluid housed within the second set of coolant channels 52 to the refrigerant fluid housed within the refrigerant channels 54, thereby cooling the coolant.

In the embodiments illustrated in FIGS. 4-7, the second cooling block 44 includes coolant removal channels 110 that are in fluid communication with the coolant outlet 46. In some embodiments, the second gyroid structure 50 defines the coolant removal channels 110. In such embodiments, the second gyroid structure 50 may define one of various shapes that, in turn, define the coolant removal channels 110. For example, the second gyroid structure 50 may define a conical recess 82, where the coolant removal channels 110 are defined along an outer periphery of the conical recess 82. According to various aspects, the coolant outlet 46 has a cross-section value that is larger than the cross-section value of the second set of coolant channels 52. A transition of coolant flow may be realized via coolant removal channels 110 that have a cross-section value or values intermediate between that of the coolant outlet 46 and second set of coolant channels 52 and that are disposed between the coolant outlet 46 and the second set of coolant channels 52. In some embodiments, the coolant removal channels 110 are configured to transition coolant fluid flow from the second set of coolant channels 52 to the coolant outlet 46. Additionally, it is generally contemplated that the coolant removal channels 110 may have a shape defined by the interface of the coolant removal channels 110 with the second set of coolant channels 52, and where that interface may at least partially determine a flow-rate of the coolant fluid out of the second set of coolant channels 52.

In the embodiments illustrated in FIGS. 4-7, the second cooling block 44 includes refrigerant removal channels 120 that are in fluid communication with the refrigerant outlet 48. In some embodiments, the second gyroid structure 50 defines the refrigerant removal channels 120. In such embodiments, the second gyroid structure 50 may define one of various shapes that, in turn, define the refrigerant removal channels 120. For example, the second gyroid structure 50 may define a conical recess 82, where the refrigerant removal channels 120 are defined along an outer periphery of the conical recess 82. According to various aspects, the refrigerant outlet 48 has a cross-section value that is larger than the cross-section value of the second set of refrigerant channels 54. A transition of refrigerant flow may be realized via the refrigerant removal channels 120 that have a cross-section value or values intermediate between that of the refrigerant outlet 48 and second set of refrigerant channels 54 and that is disposed between the refrigerant outlet 48 and the second set of refrigerant channels 54. In some embodiments the refrigerant removal channels 120 are configured to transition refrigerant fluid flow from the second set of refrigerant channels 54 to the refrigerant outlet 48. Additionally, it is generally contemplated that the refrigerant removal channels 120 may have a shape defined by the interface of the refrigerant removal channels 120 with the second set of refrigerant channels 54, and where that interface may at least partially determine a flow-rate of the refrigerant fluid out of the second set of refrigerant channels 54.

According to various aspects, it is generally contemplated that the heat exchanger 10 can include one or more conical recesses 82 that define the introduction channels 80, 90 and the removal channels 110, 120. For example, the first gyroid structure 38 can define a first conical recess 82a that defines the coolant introduction channels 80 and a second conical recess 82b that defines the refrigerant introduction channels 90, where the second conical recess 82b opposes the first conical recess 82a and extends towards the first conical recess 82a. Likewise, the second gyroid structure 50 can define a third conical recess 82c that defines the coolant removal channels 110 and a fourth conical recess 82d that defines the refrigerant removal channels 120, where the fourth conical recess 82d opposes the third conical recess 82c and extends towards the third conical recess 82c. Additionally, it is further contemplated that each conical recess 82a, 82b, 82c and 82d may define a shape and/or depth that coincides or differs from each other conical recess 82a, 82b, 82c and 82d. For example, the first conical recess 82a and the third conical recess 82c may have a greater depth into each gyroid structure 38, 50 than the second conical recess 82b and the fourth conical recess 82d. In such examples, the greater depth of the first conical recess 82a and the third conical recess 82c may increase an increased rate of coolant flow relative to the rate of refrigerant flow.

Referring now to FIGS. 3-7, the heat exchanger 10 includes the coolant outlet 46 and the refrigerant outlet 48. The coolant outlet 46 is intended to guide the coolant fluid out of the second cooling block 44, and the refrigerant outlet 48 is intended to guide the refrigerant fluid out of the second cooling block 44, where the refrigerant fluid may be in a general counter-flow to the coolant fluid. In some aspects, both the coolant outlet 46 and the refrigerant outlet 48 are coupled to the housing 30. For example, the coolant outlet 46 and the refrigerant outlet 48 can be coupled to opposing sides of the housing 30, which allows for counter-flow, where the refrigerant fluid flows in the opposite direction as the coolant fluid. Further, while the coolant outlet 46 and the refrigerant outlet 48 may be arranged where the outlets 46, 48 direct a fluid flow that is perpendicular to the housing 30. It is further contemplated that the coolant outlet 46 and/or the refrigerant outlet 48 may also form an acute angle between the surface of the outlets 46, 48 and the housing 30.

Referring now to FIG. 7, the coolant path 72 of the heat exchanger 10 generally directs coolant fluid through the heat exchanger 10. In particular, the coolant path 72 can direct the coolant fluid from the coolant inlet 34, through the coolant introduction channels 80 and into the first set of coolant channels 40. The coolant path 72 then directs the coolant fluid through the first plurality of perforations 100 and into the second set of coolant channels 52. The coolant fluid is then directed to the coolant removal channels 110 and out of the coolant outlet 46.

Referring again to FIG. 7, the refrigerant path 74 of the heat exchanger 10 generally directs refrigerant fluid through the heat exchanger 10. In particular, the refrigerant path 74 can direct the refrigerant fluid from the refrigerant inlet 36, through the refrigerant introduction channels 90, and into the first set of refrigerant channels 42. The refrigerant path 74 then directs the refrigerant fluid through the second plurality of perforations 102 and into the second set of refrigerant channels 54. The refrigerant fluid is then directed to the refrigerant removal channels 120 and out of the refrigerant outlet 48.

As illustrated in FIG. 7, the coolant path 72 can be in a counter-flow configuration relative to the refrigerant path 74. This counter-flow permits thermal transfer to occur between the coolant fluid and the refrigerant fluid. In some embodiments, the coolant flow can be reversed, such that the coolant fluid flows in through a coolant outlet 46, through a second set of coolant channels 52, to the first set of coolant channels 40 through the barrier plate 56, through the coolant introduction channels 80, and out of the coolant inlet 34. This alternative coolant path would allow for a parallel flow configuration.

Referring to FIGS. 1-7, the heat exchanger 10 may be manufactured by an additive manufacturing process wherein successive layers of material or materials are disposed on each other to "build-up," layer-by-layer, a three-dimensional component. The successive layers generally fuse together to form a monolithic component. In some embodiments, the housing 30, first cooling block 32, barrier plate 56, and second cooling block 44 are all made in the same additive manufacturing process. In other embodiments, other methods of fabrication known in the art are possible, such as layer-additive processes, layer-subtractive processes, or hybrid processes. In some embodiments the heat exchanger 10 may be manufactured by a combination of these processes. In some embodiments the heat exchanger 10 is manufactured by combining an additive manufacturing process with layer-additive processes, layer-subtractive processes, or hybrid process. In some embodiments, the heat exchanger 10 is manufactured by additively manufacturing one component of the heat exchanger 10 while using a machining process, such as electrical discharge machining, to fabricate another component of the heat exchanger 10. According to various aspects, the heat exchanger 10 can be made out of any thermally conductive material, such as metals. Ideal metals for use as heat exchanger materials may include nickel, nickel alloys, cobalt, cobalt alloys, chrome moly, titanium, aluminum, aluminum alloys, or a combination thereof.

Figure 8:
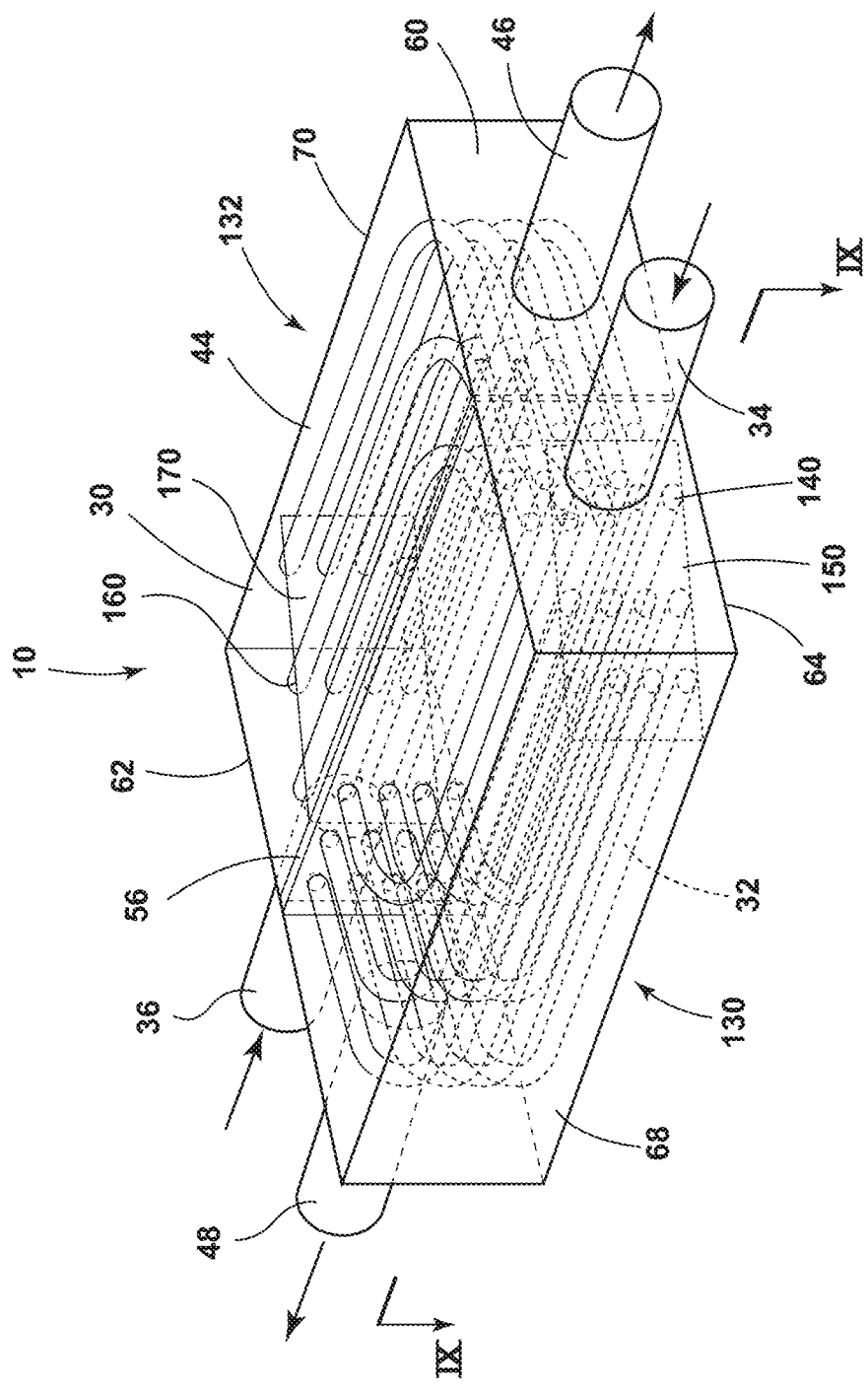
FIG. 8 is a perspective view of a heat exchanger with a first plurality of tubes, a second plurality of tubes, and a barrier plate, according to one embodiment.
Figure 9:
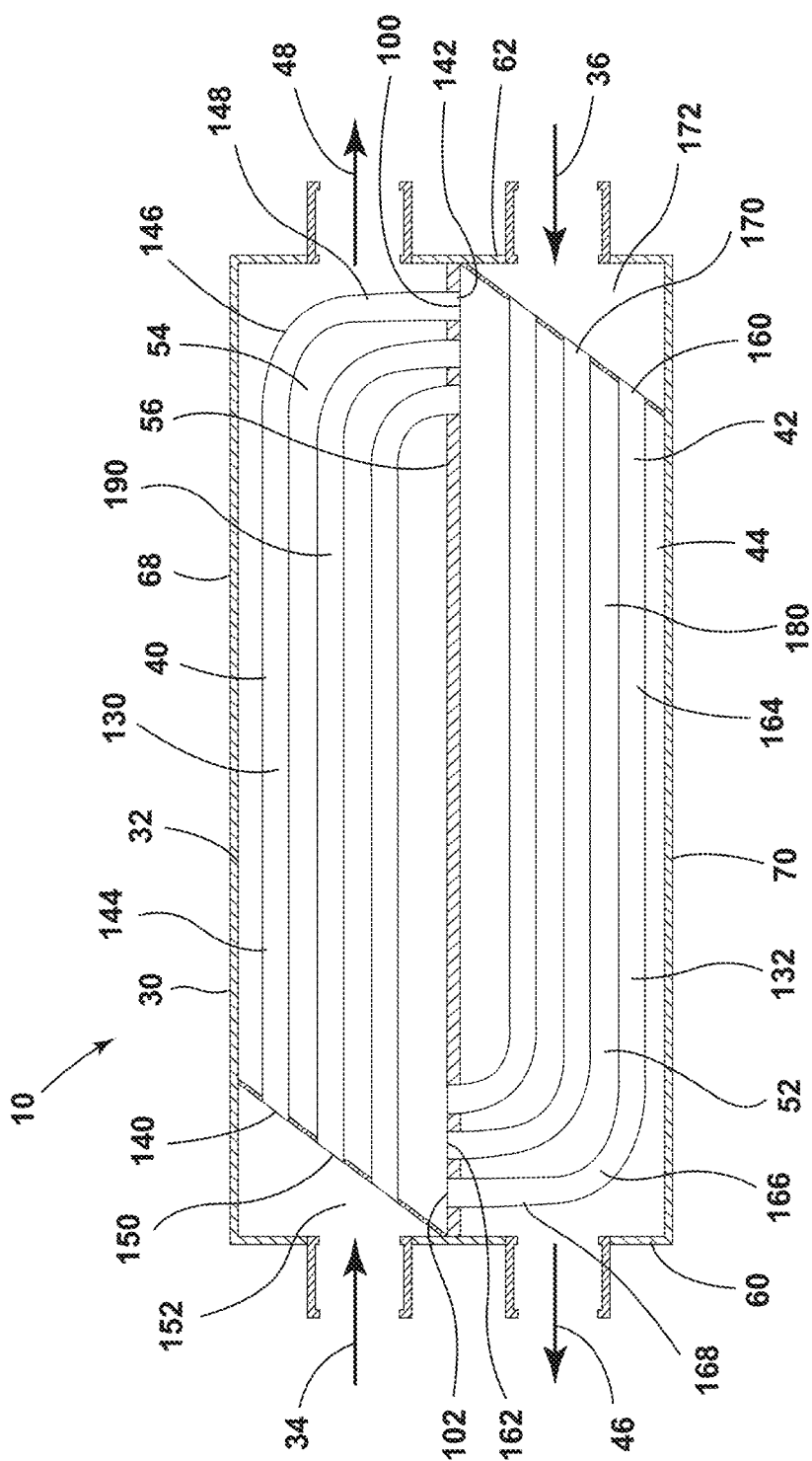
FIG. 9 is a top view of a heat exchanger with a first plurality of tubes, a second plurality of tubes, and a barrier plate, according to one embodiment.

Referring now to FIGS. 8-10, the heat exchanger 10 can include a first plurality of tubes 130 within the first cooling block 32 and a second plurality of tubes 132 in the second cooling block 44. According to various aspects, the coolant inlet 34 can be in fluid communication with the first plurality of tubes 130 and the refrigerant inlet 36 can be in fluid communication with the second plurality of tubes 132. In such aspects, the first plurality of tubes 130 are configured to direct the flow of the coolant fluid from the coolant inlet 34, along the first cooling block 32, and into the second cooling block 44, and the second plurality of tubes 132 are configured to direct the flow of the refrigerant fluid from the refrigerant inlet 36, through the second cooling block 44, and into the first cooling block 32, as provided herein.

Referring further to FIGS. 8-10, the first plurality of tubes 130 can be disposed within the first cooling block 32. In some examples, the first plurality of tubes 130 can be disposed within the first cooling block 32 such that a coolant inlet 140 of the first plurality of tubes 130 is proximate the coolant inlet 34 and a coolant outlet 142 of the first plurality of tubes 130 is abutting the barrier plate 56 and generally aligned with the first plurality of perforations 100. According to various aspects, each tube of the first plurality of tubes 130 may include a first segment 144 that extends away from the coolant inlet 34, a bend 146 at an end of the first segment 144, and a second segment 148 that extends away from the bend 146 and towards the barrier plate 56. Each tube of the first plurality of tubes 130 may have a shape and/or length that coincides with or differs from each other tube of the first plurality of tubes 130. For example, each tube 130 can be offset from one another such that each tube 130 is generally the same length and size. According to various aspects, the first plurality of tubes 130 are configured to define the first set of coolant channels 40 that direct the coolant fluid away from the coolant inlet 34 and towards the first plurality of perforations defined on the barrier plate 56.

Referring now to FIGS. 8 and 9, the heat exchanger 10 can include a coolant introduction plate 150 disposed within the first cooling block 32. The coolant introduction plate 150 can be coupled to the bottom panel 64 and the top panel 66 of the housing 30. In some examples, the coolant introduction plate 150 can be obliquely orientated in the first cooling block 32 such that the coolant introduction plate 150 abuts the sidewall of the housing 30 and the barrier plate 56. In such examples, the coolant introduction plate's 150 degree of orientation may at least partially coincide with the alignment of the first plurality of tubes 130. For example, each tube of the first plurality of tubes 130 can be coupled to the coolant introduction plate 150 such that inlets 140 of the first plurality of tubes 130 are protruding from, flush with, or recessed from the coolant introduction plate 150. According to various aspects, the coolant introduction plate 150 is configured to define a coolant inlet flow chamber 152 that permits uniform flow of the coolant fluid into the first plurality of tubes 130. In such aspects, the coolant inlet flow chamber 152 may define one of various shapes, such as a triangular, rounded, prismatic, and/or one of other various shapes that permit coolant flow into the first cooling block 32 and the first plurality of tubes 130. In yet other aspects, the coolant introduction plate 150 may function as a barrier that redirects the refrigerant fluid towards the refrigerant outlet 48 as the refrigerant fluid passes through the second plurality of perforations 102, as provided herein.

Referring further to FIGS. 8-10, the second plurality of tubes 132 can be disposed within the second cooling block 44. In some examples, the second plurality of tubes 132 can be disposed within the second cooling block 44 such that an inlet 160 of the second plurality of tubes 132 is proximate the refrigerant inlet 36 and an outlet 162 of the second plurality of tubes 132 is abutting the barrier plate 56 and generally aligned with the second plurality of perforations 102. According to various aspects, each tube of the second plurality of tubes 132 may include a first section 164 that extends away from the refrigerant inlet 36, a bend 166 at an end of the first section 164, and a second section 168 that extends away from the bend 166 and towards the barrier plate 56. As illustrated in FIGS. 8 and 9, the second plurality of tubes 132 can be disposed in the second cooling block 44 and be in a mirrored, parallel, inverted, or another configuration relative to the first plurality of tubes 130. Each tube of the second plurality of tubes 132 may have a shape and/or length that coincides with or differs from each other tube of the second plurality of tubes 132. For example, each tube 132 can be offset from one another such that each tube 132 is generally the same length and size. According to various aspects, the second plurality of tubes 132 are configured to define the first set of refrigerant channels 42 that direct the coolant fluid away from the coolant inlet 34 and towards the first plurality of perforations 100 defined on the barrier plate 56.

Referring now to FIGS. 8 and 9, the heat exchanger 10 can include a refrigerant introduction plate 170 disposed within the second cooling block 44. The refrigerant introduction plate 170 can be coupled to the bottom panel 64 and the top panel 66 of the housing 30. In some examples, the refrigerant introduction plate 170 can be obliquely orientated in the second cooling block 44 such that the refrigerant introduction plate 170 abuts the sidewall of the housing 30 and the barrier plate 56. In such examples, the refrigerant introduction plate's 170 degree of orientation may at least partially coincide with the alignment of the second plurality of tubes 132. For example, each tube 132 of the second plurality of tubes 132 can be coupled to the refrigerant introduction plate 170 such that inlets 160 of the second plurality of tubes 132 are protruding from, flush with, or recessed from the refrigerant introduction plate 170. According to various aspects, the refrigerant introduction plate 170 is configured to define a refrigerant inlet flow chamber 172 that permits uniform flow of the refrigerant fluid into the second plurality of tubes 132. In such aspects, the refrigerant inlet flow chamber 172 may define one of various shapes, such as a triangular, rounded, prismatic, and/or one of other various shapes that permit refrigerant flow into the second cooling block 44 and the second plurality of tubes 132. In yet other aspects, the refrigerant introduction plate 170 may function as a barrier that redirects the coolant fluid towards the coolant outlet 46 as the coolant fluid passes through the first plurality of perforations 100, as provided herein Referring now to FIG. 10, the coolant path 72, directs the coolant fluid through the heat exchanger 10. In particular, the coolant path 72 directs the coolant fluid through the coolant inlet 34 and into the coolant inlet flow chamber 152, where the coolant fluid is directed into the inlets 140 of the first plurality of tubes 130. The coolant fluid then travels through the first plurality of tubes 130 and the first plurality of perforations 100. The coolant fluid is then directed by the refrigerant introduction plate 170 to a plurality of coolant channels 180 that are defined between the second plurality of tubes 132, where the plurality of coolant channels 180 define the second set of coolant channels 52 and have a shape and/or size that is at least partially determined by the placement, size, and/or shape of the second plurality of tubes 132. The coolant fluid is then directed along the plurality of coolant channels 180 and out of the coolant outlet 46.

Referring again to FIG. 10, the refrigerant path 74, in the embodiments shown in FIGS. 8-10, directs the refrigerant fluid through the heat exchanger 10. In particular, the refrigerant path 74 directs the refrigerant fluid through the refrigerant inlet 36 and into the refrigerant inlet flow chamber 172, where the refrigerant fluid is directed into the inlets 160 of the second plurality of tubes 132. The refrigerant fluid then travels through the second plurality of tubes 132 and the second plurality of perforations 102. The refrigerant fluid is then directed by the coolant introduction plate 150 to a plurality of refrigerant channels 190 that are defined between the first plurality of tubes 130, where the plurality of refrigerant channels 190 define the second set of refrigerant channels 190 and have a shape and/or size that is at least partially determined by the placement, size, and/or shape of the first plurality of tubes 130. The refrigerant fluid is then directed along the plurality of refrigerant channels 190 and out of the refrigerant outlet 48.

As illustrated in FIG. 10, the coolant path 72 can be in a counter-flow configuration relative to the refrigerant path 74. This counter-flow permits thermal transfer to occur between the coolant fluid and the refrigerant fluid as the coolant fluid travels through the first plurality of tubes 130 and the refrigerant fluid travels through the plurality of refrigerant channels 190 as the coolant fluid travels through the plurality of coolant channels 180 and the refrigerant fluid travels through the second plurality of tubes 132. In some embodiments, the coolant flow can be reversed, such that the coolant fluid flows in through the coolant outlet 46, through the plurality of coolant channels 180 and the first plurality of perforations 100, into the first plurality of tubes 130, and out of the coolant inlet 34. This alternative coolant path permits a parallel flow configuration of the heat exchanger 10.

Use of the presently disclosed device may provide for a variety of advantages. For example, the heat exchanger 10, by utilizing a first cooling block 32, a second cooling block 44, and a barrier plate 56, permits the utilization of a compact heat exchanger 10 in a vehicle 12. In particular, the use of a gyroid structure, such as the first gyroid structure 38 and the second gyroid structure 50 permits efficient thermal transfer, due to the high surface-area-to-volume ratio of the gyroid heat exchanger 10, relative to traditional heat exchangers. Additionally, the use of the first plurality of tubes 130 with the coolant introduction plate 150 and the second plurality of tubes 132 with the refrigerant introduction plate 170 provides for a compact heat exchanger 10 that can effectively permit thermal transfer in a compact heat exchanger 10, relative to traditional heat exchangers.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A heat exchanger, comprising:
   a housing;
   a first cooling block defined within the housing, the first cooling block comprising a coolant inlet, a refrigerant inlet opposing the coolant inlet, and a first gyroid structure defining a first set of coolant channels and a first set of refrigerant channels;
   a second cooling block defined within the housing, the second cooling block comprising a coolant outlet, a refrigerant outlet opposing the coolant outlet, and a second gyroid structure defining a second set of coolant channels and a second set of refrigerant channels; and
   a perforated barrier plate interposed between the first cooling block and the second cooling block, wherein the first set of coolant channels is in fluid communication with the second set of coolant channels via perforations in the barrier plate, and wherein the first set of refrigerant channels is in fluid communication with the second set of refrigerant channels via perforations in the barrier plate.

2. The heat exchanger of claim 1, wherein the coolant inlet further comprises coolant introduction channels that direct fluid flow into the first set of coolant channels, and wherein the refrigerant inlet further comprises refrigerant introduction channels that direct fluid flow into the first set of refrigerant channels.

3. The heat exchanger of claim 2, wherein the coolant outlet further comprises coolant removal channels that direct fluid flow out of the second set of coolant channels, and wherein the refrigerant outlet further comprises refrigerant removal channels that direct fluid flow out of the second set of refrigerant channels.

4. The heat exchanger of claim 3, wherein at least one of the coolant introduction channels and the refrigerant introduction channels are defined by the first gyroid structure, and wherein at least one of the coolant removal channels and refrigerant removal channels are defined by the second gyroid structure.

5. The heat exchanger of claim 1, wherein the housing, the first gyroid structure, the second gyroid structure, and the barrier plate are integrally coupled.

6. The heat exchanger of claim 1, wherein the first gyroid structure defines a first conical recess proximate the coolant inlet and a second conical recess proximate the refrigerant inlet, wherein the second conical recess extends towards the first conical recess.

7. The heat exchanger of claim 6, wherein the second gyroid structure defines a third conical recess proximate the coolant outlet and a fourth conical recess proximate the refrigerant outlet, wherein the fourth conical recess extends towards the third conical recess.

8. The heat exchanger of claim 1, wherein the coolant inlet and coolant outlet are arranged on a front panel of the housing, and wherein the refrigerant inlet and refrigerant outlet are arranged on a rear panel of the housing.

9. The heat exchanger of claim 1, wherein coolant fluid is directed along a coolant path and refrigerant fluid is directed along a refrigerant path, the refrigerant path being in a counter-flow configuration relative to the coolant path.

10. A heat exchanger, comprising:
    a housing;
    a first cooling block defined within the housing, the first cooling block comprising a coolant inlet and a refrigerant outlet opposing the coolant inlet;
    a second cooling block defined within the housing, the second cooling block comprising a coolant outlet and a refrigerant inlet opposing the coolant outlet;
    a first set of cooling channels and a first set of refrigerant channels defined in at least one of the first cooling block and the second cooling block;
    a second set of cooling channels and a second set of refrigerant channels defined in at least one of the first cooling block and the second cooling block; and
    a perforated barrier plate interposed between the first cooling block and the second cooling block, wherein the first set of coolant channels is in fluid communication with the second set of coolant channels via perforations in the barrier plate, and wherein the first set of refrigerant channels is in fluid communication with the second set of refrigerant channels via perforations in the barrier plate.

11. The heat exchanger of claim 10, wherein a gyroid structure defines at least one of the first set of coolant channels, the second set of coolant channels, the first set of refrigerant channels, and the second set of refrigerant channels.

12. The heat exchanger of claim 10, wherein a first plurality of tubes are disposed in the first cooling block and a second plurality of tubes are disposed in the second cooling block, and wherein the first plurality of tubes defines at least one of the first set of coolant channels and the second set of refrigerant channels, and wherein the second plurality of tubes defines at least one of the second set of coolant channels and the first set of refrigerant channels.

13. The heat exchanger of claim 12, wherein the first set of coolant channels extend through the first plurality of tubes and the second set of refrigerant channels are defined by a space between each tube of the first plurality of tubes, and wherein the first set of refrigerant channels extend through the second plurality of tubes and the second set of coolant channels are defined by a space between each tube of the second plurality of tubes.

14. The heat exchanger of claim 10, further comprising a coolant path that directs coolant fluid through the first cooling block, across the barrier plate, and through the second cooling block, and a refrigerant path that directs refrigerant fluid through the first cooling block, across the barrier plate, and through the second cooling block, wherein the refrigerant path directs refrigerant fluid in a counter-flow to the coolant fluid in the coolant path.

15. The heat exchanger of claim 10, wherein the coolant inlet and coolant outlet are arranged on the same side of the heat exchanger, and wherein the refrigerant inlet and refrigerant outlet are arranged on the same side of the heat exchanger.

16. A heat exchanger, comprising:
a housing;
a first cooling block defined within the housing, the first cooling block comprising a coolant inlet and a refrigerant outlet opposing the coolant inlet;
a second cooling block defined within the housing, the second cooling block comprising a coolant outlet and a refrigerant inlet opposing the coolant outlet;
a perforated barrier plate interposed between the first cooling block and the second cooling block, the perforated barrier plate defining a plurality of perforations on opposing ends of the barrier plate;
a first plurality of tubes disposed in the first cooling block, the first plurality of tubes directing coolant fluid from the coolant inlet to the plurality of perforations; and
a second plurality of tubes disposed in the second cooling block, the second plurality of tubes directing refrigerant fluid from the refrigerant inlet to the plurality of perforations.

17. The heat exchanger of claim 16, wherein the first plurality of tubes defines at least one of the first set of coolant channels and the second set of refrigerant channels, and wherein the second plurality of tubes defines at least one of the second set of coolant channels and the first set of refrigerant channels.

18. The heat exchanger of claim 17, wherein the first set of coolant channels extend through the first plurality of tubes and the second set of refrigerant channels are defined by a space between each tube of the first plurality of tubes, and wherein the first set of refrigerant channels extend through the second plurality of tubes and the second set of coolant channels are defined by a space between each tube of the second plurality of tubes.

19. The heat exchanger of claim 16, further comprising:
a coolant introduction plate disposed in the first cooling block, the coolant introduction plate being obliquely oriented and extending from a front panel of the housing to a rear panel of the housing; and
a refrigerant introduction plate disposed in the second cooling block, the refrigerant introduction plate being obliquely orientated and extending from the rear panel and towards the front panel.

20. The heat exchanger of claim 19, wherein the first plurality of tubes are coupled to the coolant introduction plate, and wherein the first plurality of tubes each include an inlet, each inlet being flush with the coolant introduction plate, and wherein the second plurality of tubes are coupled to the refrigerant introduction plate, and wherein the second plurality of tubes each include an inlet, each inlet being flush with the refrigerant introduction plate.

* * * * *